United States Patent [19]

Williams

[11] 4,230,347
[45] Oct. 28, 1980

[54] TEE CONNECTION FOR WELL WATER STORAGE TANKS

[75] Inventor: Clifford C. Williams, Iowa City, Iowa

[73] Assignee: Klasing Industries, Inc., Joliet, Ill.

[21] Appl. No.: 885,354

[22] Filed: Mar. 13, 1978

[51] Int. Cl.² ............................................. F16L 55/00
[52] U.S. Cl. ...................................... 285/119; 285/93; 285/150; 285/158; 285/337; 285/363; 285/404
[58] Field of Search ............... 285/404, 337, 413, 150, 285/158, 155, 156, 363, 119, 93; 200/81.9 R, 83.5 A; 417/297, 307; 137/568; 138/30

[56] References Cited

U.S. PATENT DOCUMENTS

| 186,351 | 1/1877 | Leland | 285/150 |
|---|---|---|---|
| 1,482,376 | 2/1924 | Anderson | 137/560 |
| 2,564,428 | 8/1951 | Ford et al. | 285/61 X |
| 2,642,312 | 6/1953 | Shine | 285/61 X |
| 2,829,597 | 4/1958 | Patterson | 285/177 X |
| 2,919,321 | 12/1959 | Lung | 200/83.5 A |
| 3,333,872 | 8/1967 | Crawford et al. | 285/404 |

FOREIGN PATENT DOCUMENTS

| 1377087 | 9/1964 | France | 285/404 |
|---|---|---|---|
| 556087 | 2/1957 | Italy | 285/156 |

*Primary Examiner*—Dave W. Arola
*Attorney, Agent, or Firm*—Gerlach & O'Brien

[57] ABSTRACT

A break-away tank tee fitting for connecting a well water storage tank to the supply or service line. The tank tee fitting has a unique disconnect arrangement for connecting the service line to either a bottom or side inlet tank. This arrangement allows the tank to be removed and replaced without cutting any pipes or wires. The tank tee fitting also provides a unique arrangement designed to easily accommodate in less space the pump switch and pressure gauge normally found in systems where the fitting is used.

9 Claims, 5 Drawing Figures

TEE CONNECTION FOR WELL WATER STORAGE TANKS

BACKGROUND OF THE INVENTION

The invention relates to private water systems for individual residences and the like which systems employ a water storage tank into which the water is pumped from the well and from which the water is withdrawn into the service line leading to the various outlets in the facility being served. Regardless of its type, the storage tank is commonly connected to the service line by a so-called tank tee fitting a leg of which leads to the inlet at either the bottom or side of the tank depending upon the type of tank used in the system. Such tank tee fittings are commonly made from a pipe fitting in the form of a machined brass casting, and a length of copper tubing soldered to the pipe fitting at one end of the tubing and to a male threaded fitting at the other end for connection to the tank. Normally, the latter fitting is first threaded into the tank inlet and tightened. The pipe fitting component of the tank tee fitting is then connected to the supply line using the threaded connections at its ends. However, if the pipe fitting is not properly aligned to allow connections with the supply line pipes, the entire tank tee fitting will have to be turned. This may loosen the connection of the fitting to the tank an amount such that it will leak. Tightening the fitting beyond its initial "snug" tightening to provide the proper alignment may be impossible. The installer therefore may be in a dilemma. Once properly installed, these one piece tank tee fittings provide an excellent, permanent connection of the tank to the line. However, if it becomes necessary to remove the tank, both the in and out supply piping must be dismantled along with the wiring leading to the pump switch connected in the line. This can be a very difficult task especially where the tank is located in confined quarters. There is therefore a need for a break-away type fitting which will facilitate easy installation and replacement of the storage tank. Although threaded connections can provide a break-away feature, in addition to the above-mentioned difficulties, there frequently is not sufficient room to allow use of this type of connection.

Moreover, tank tee fittings of the prior art are commonly manufactured with a female thread formed in each end of the pipe fitting component to provide connections for a pump switch and pressure gauge. Because the pipe fitting is generally cast brass, these provisions for the pump switch and pressure gauge increase the size of the fitting and thus its cost. There is therefore also a need for an arrangement which will allow a smaller pipe fitting to be produced at a lower cost.

SUMMARY OF THE INVENTION

The invention provides a tank tee fitting of reduced dimensions that greatly facilitates installation and replacement of the storage tank by making it easy to connect it to and disconnect it from the service line. One embodiment of the tank tee fitting includes in its structure is slip-type of joint in connection with an O-ring type of seal and a locking screw or screws, whereby the copper tube component of the fitting and the tank can be removed together and separated from the pipe fitting component simply by loosening the locking screw or screws and sliding the tube from the pipe fitting. When the tank and tube are installed or replaced, the tube simply slips into the pipe fitting as the tank is set in place and the locking screw or screws tightened. This avoids any need to disturb the piping and wiring attached to the pipe fitting component, which would otherwise be necessary. In another embodiment of the tank tee fitting, the pipe fitting component is formed in two parts, one to which the supply lines are attached and the second into which the tube component is slipped. The two parts of the pipe fitting are then clamped together with a gasket which seals the two parts and the tube. Alternatively, the tube component may be cast integrally with the second part of the pipe fitting component.

Also, the tank tee fitting of the invention provides connections for the pump switch and pressure gauge that greatly reduce the size of the fitting and thus its cost. These connections for the pump switch and pressure gauge provide for mounting these attachments at acute angles to the vertical rather than vertically as provided by prior art fittings.

Thus, the invention provides less expensive tank tee fittings that greatly facilitate installation and replacement of the storage tank.

DESCRIPTION OF THE PREFERRED EMBODIMENTS OF THE INVENTION

The invention relates to a water supply system of the type in which a private well supplies the needs of individual residences and the like. In such systems, a well (not shown) provides a source of water that is connected by a supply line 10 to a water storage tank 12 for distribution to the various outlets (not shown) in the facility being served. As is well known to those skilled in the art, a pump (not shown) is provided in the system to pump the water from the well to the storage tank and to the facility being served. There is therefore typically connected in the system a pressure gauge 14 and a pump switch 16 which control operation of the pump to maintain pressure in the system and to maintain a minimum level of water in the tank 12. Gauge 14 and switch 16 are connected in the system in the manner described hereinafter.

Figure 1:
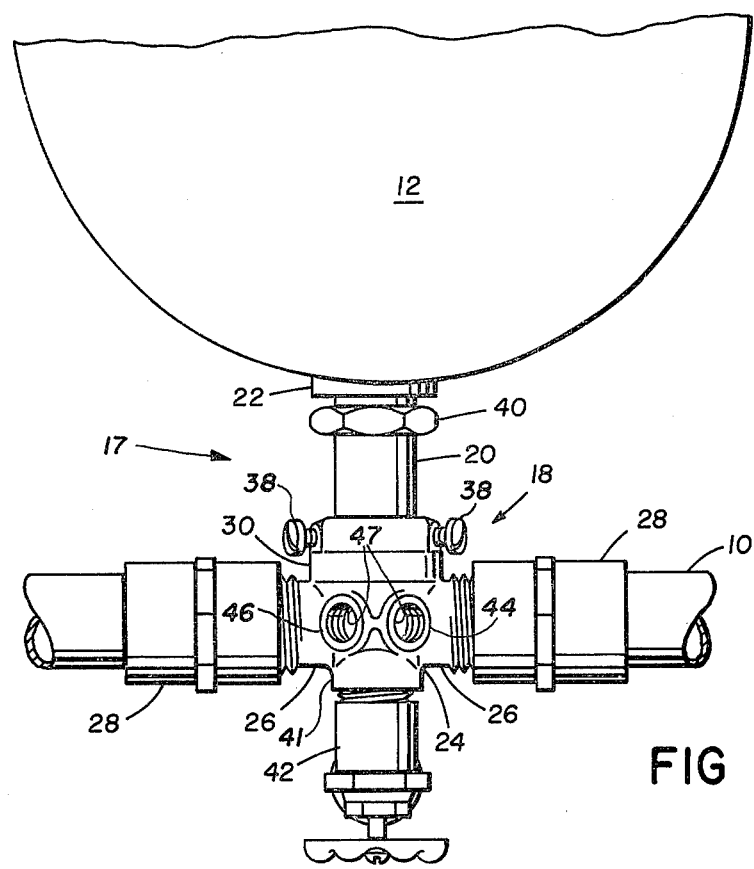
FIG. 1 is a top plan view showing a storage tank connected to the line using a preferred embodiment of the tank tee fitting of the invention.
Figure 2:
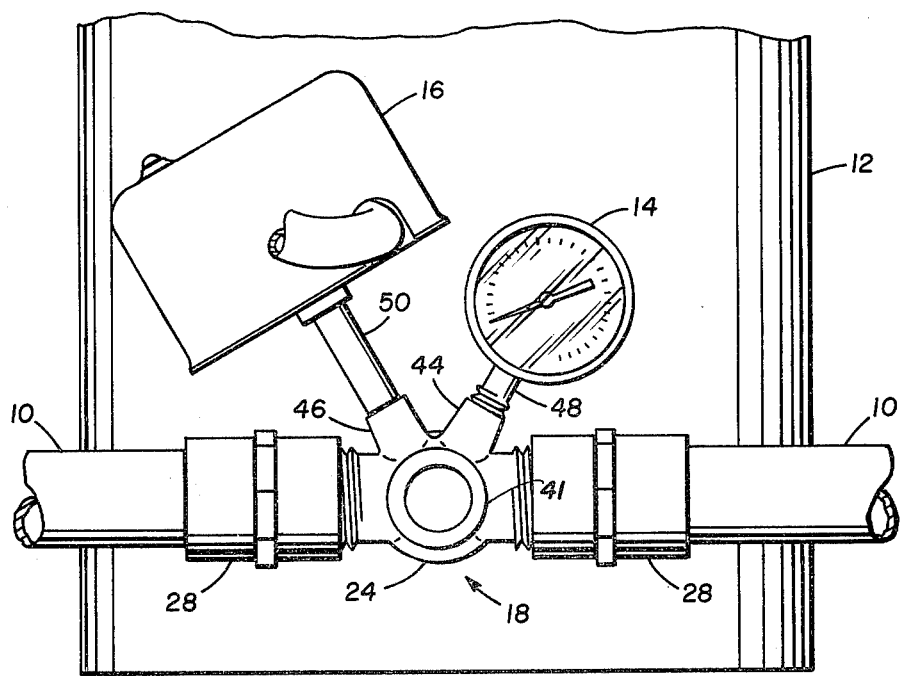
FIG. 2 is an elevational view of the fitting showing the connections for the tank switch and pressure gauge.
Figure 3:
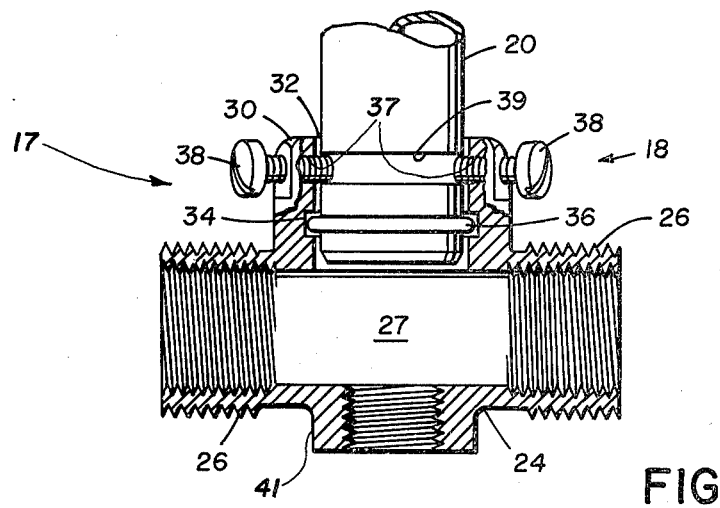
FIG. 3 is a sectional view of the fitting, the sectional view being taken on a horizontal plane.

Referring to FIGS. 1-3 of the drawings, a "tank tee" fitting 17 is provided in a preferred embodiment of the invention, for removably connecting the tank 12 to the supply line 10. The tank tee fitting inlcudes a cross-type pipe fitting 18 connected in the supply line 10, and a generally cylindrical tube 20 removably connected to the pipe fitting and connected to the inlet 22 of the tank 12. The inlet 22 may be located on the side of tank 12 or at the bottom depending upon the type of tank installed in the system. There is illustrated in FIG. 1 a side-inlet type tank which requires a shorter tube 20 than the bottom-inlet type tank. The pipe fitting 18 preferably is a brass casting, and the tube 20 preferably is formed of copper tubing.

The pipe fitting 18 includes a hollow body or head 24 having an integral longitudinally extending tubular main branch or outlet 26 on each of two opposite sides of the body, which main branches define a rectilinear main passageway 27 together with the body 24. Each main branch 26 is threaded with both a male and female thread (FIG. 3) to provide for connection of the pipe fitting 18 in the supply line 10. Connection in the line 10 is made by a suitable coupling 28 threaded onto each main branch 26.

The pipe fitting 18 also has an integral tubular side branch or outlet 30 extending laterally from the body 24 at right angles to the main branches 26. The side branch 30 has machined therein a side passageway 32 (FIG. 3) and an annular groove 34 extending around the passageway 32 and receiving a sealing ring in the form of an O-ring 36. The side branch 30 also has formed in the wall thereof at least one threaded opening for receiving a set screw 38. In the embodiment shown, there are two such openings 37 and set screws 38, which set screws extend inwardly into the side passageway 32 to engage in a peripheral groove 39 roll-formed near the end of the tube 20. The openings for the set screws 38 are formed at an angle from the horizontal to facilitate loosening and tightening of the screws 38.

When the tank tee fitting 17 is properly connected in the line 10 and to tank 12, there is received in the side passageway 32 in the side branch 30 one end of the tube 20, which extends inwardly beyond groove 34 containing O-ring 36. The O-ring 36 thus is interposed between the side branch 30 and the one tube end, to seal the joint between the tube 20 and the pipe fitting 18. When the set screws 38 are tightened sufficiently to extend into the groove 39 in the tube 20, a positive lock is provided to prevent the tube 20 from pulling out of the joint until the set screws 38 are loosened. The end of tube 20 opposite the end containing groove 39 is connected to the inlet 22 of the tank 12 by a suitable fitting 40.

The pipe fitting 18 also preferably has a tubular threaded side branch or outlet 41 extending laterally from the body 24 at right angles to the main branches 26 and opposite to the machined side branch 30. The threaded side branch 41 is provided with a female thread for receiving a drain faucet 42 (FIG. 1) or other fitting.

At the top of the body 24 and arranged centrally thereof is a pair of tubular bosses 44 and 46, which bosses have threaded openings 47 therein extending into the main passageway 27. Boss 44 is threaded to receive a nipple 48 for connection of the pressure gauge 14, and boss 46 is threaded to receive a nipple 50 for connection of the pump switch 16. The bosses 44 and 46 and the threaded openings 47 therein extend upwardly (in normal use) at acute angles from the body 24 longitudinally thereof, and also at acute angles to the vertical. The bosses 44 and 46 join the body 24 contiguously or closely adjacent to each other, and they extend angularly with respect to each other. This construction reduces the dimensions of the pipe fitting 18 by a substantial amount, thus saving material costs while still permitting installation of the gauge 14 and pump switch 16.

With the foregoing described construction, installation or removal of the tank 12 is a relatively simple operation. When the tank 12 is first installed, the tube 20 of the tank tee fitting is connected to the inlet 22 of tank 12. The pipe fitting 18 may be then connected to the other end of tube 20, or the pipe fitting 18 may be connected to tube 20 prior to connection of the tube 20 to the inlet 22 of tank 12. In either case, the set screws 38 can be tightened a sufficient amount to engage the groove 39 in tube 20, so as to hold the pipe fitting 18 on the end of tube 20 while still permitting the pipe fitting 18 to be rotated. This facilitates alignment of the main branches 26 for ease of connection of the pipe fitting 18 in the supply line 10. Once the pipe fitting 18 is properly connected to line 10 and the couplings 28 are tightened, the set screws 38 can be tightened to complete the connection of the pipe fitting 18 to the tank 12.

If it becomes necessary to replace the tank 12, removal is accomplished by loosening the set screws 38 and sliding the tube 20 out of the side passageway 32 as the tank 12 is removed. If the tank 12 is to be replaced, the tube 20 is connected first to the inlet 22 of the new tank, and with the pipe fitting 18 already connected in supply line 10, it is a simple procedure to insert the free end of tube 20 into the side passageway 32 of the pipe fitting 18 as the tank is set in place. The set screws 38 are tightened, to complete the replacement of the tank. The installation or replacement of tank 12 is thus an extremely simple and quick operation compared to prior art installations in which the service line 10 would have to be disconnected, the wiring to the pump switch 16 disconnected and the entire tank tee fitting 17 removed in order to remove the tank. Using the tank tee fitting 17 of the invention, installation and removal of the tank 12 can be accomplished even in crowded quarters. All that is necessary is a short screw driver to loosen the set screws 28.

Figure 5:
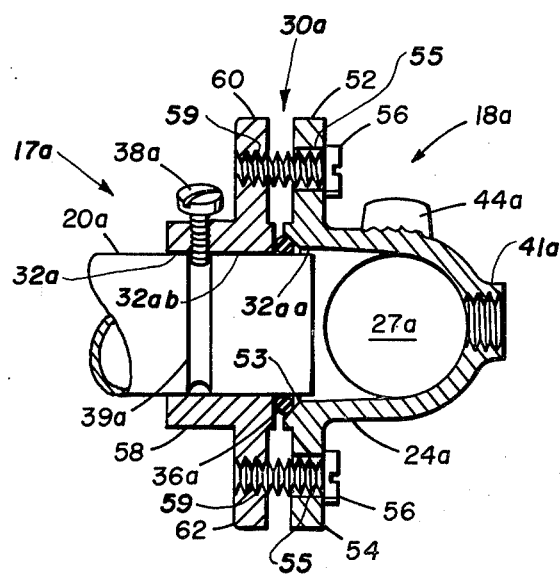
FIG. 5 is a sectional view of the modified embodiment of the fitting, which sectional view is taken on the line 5—5 of FIG. 4.
Figure 4:
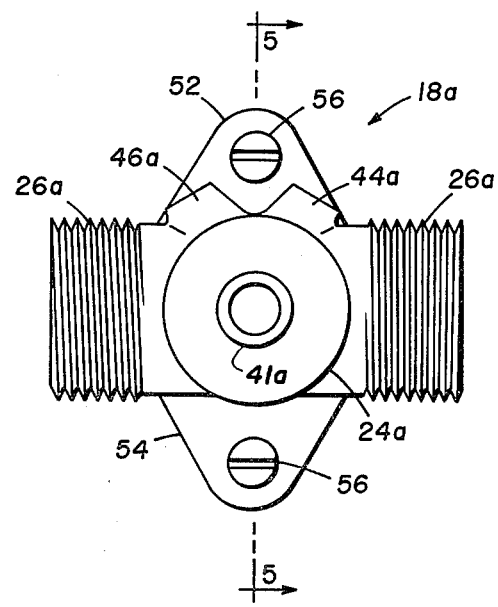
FIG. 4 is a front elevational view of a modified embodiment of the tank tee fitting, utilizing a different sealing technique.

In FIGS. 4 and 5 there is illustrated a modified tank tee fitting 17a of the invention. In describing this embodiment, components corresponding to those of the first embodiment will be referred to by the same reference numerals followed by the letter "a". Also, the embodiment of FIGS. 4 and 5 is connected in the system in the same manner as the embodiment of FIGS. 1–3.

Referring now to FIGS. 4 and 5, the cross-type pipe fitting 18a has tubular threaded main branches 26a extending rectilinearly from the hollow body 24a for connection to the supply line 10. Similarly to the first embodiment, the pipe fitting 18a has upwardly extending tubular bosses 44a and 46a, which provide connections for gauge 14 and pump switch 16. Also, a tubular side branch 41a extends laterally from the body 24a at right angles to the main branches 26a, and it contains a female thread to receive a drain faucet or other fitting similarly to the first embodiment.

An upwardly extending flange 52 and a downwardly extending flange 54 form an inner tubular section of a tubular side branch 30a, which branch extends laterally from the body 24a and oppositely to the threaded side branch 41a, at right angles to the main branches 26a. The inner section defines an inner portion 32aa of a side passageway 32a at right angles to the main passageway 27a. The edge where flanges 52 and 54 join the side passageway 32a has a chamfered surface 53, as shown in FIG. 5. Flanges 52 and 54 each have an opening 55 for receiving locking screws 56. A collar 58 having upwardly and downwardly extending flanges 60 and 62, respectively, and having an internal diameter slightly larger than the outside diameter of the tube 20a forms an outer tubular section of the side branch 30a and defines an outer portion 32ab of the side passageway 32a. The collar 58 is connected to the flanges 52 and 54 of the inner section by the locking screws 56, which are received in threaded openings 59 in the collar flanges 60 and 62. To prevent tube 20a from slipping out of the joint, a peripheral groove 39a can be formed in the end of tube 20a for engagement by set screws 38a extending through the collar 58, similarly to the first embodiment. In the alternative, collar 58 can be soldered to the end of tube 20a prior to inserting the end into the inner section of the side branch 30a.

Installation of a tank using the modified tank tee fitting 17a is similar to that described above with respect to the first embodiment. Briefly, the tube 20a is first connected to the tank 12 and then the collar 58 is placed over the free end of tube 20a. O-ring 36a is then also slipped over the free end of tube 20a. In an initial installation, the set screws 38a are tightened only enough to hold collar 58 in place while its flanges 60 and 62 are aligned with the flanges 52 and 54 of the inner section and connected thereto by the locking screws 56. The pipe fitting 18a is then aligned with the supply line 10 and connected to it. Once so connected, the set screws 38a and the locking screws 56 can be finally tightened, to compress the O-ring 36a between the collar 58 and the chamfered surface 53. If the pipe fitting 18a is already installed in the supply line 10, the end of tube 20a is slipped into the inner portion 32aa of the side passageway 32a as the tank 12 is set into place. When the tank is set in place, the collar 58 is rotated on tube 20a until its flanges 60 and 62 are aligned with the inner section flanges 52 and 54, and the flanges are connected by the locking screws 56. Set screws 38a are then tightened to engage groove 39a and lock the joint. With the locking screws 56 tightened, the O-ring 36a will be compressed to provide a water tight seal between the tube 20a and the pipe fitting 18a. Removal of the tank is accomplished by loosening the screws 38a and 56, and withdrawing the tube 20a from the pipe fitting 18a. The connection of the pipe fitting 18a in the supply line 10 need not be disturbed when installing or removing the tank.

The invention has been described in connection with two preferred embodiments of the tank tee fitting, which have less expensive, easy to use designs. In the case of the modification of FIGS. 4 and 5, if desired, the tube 20a and the collar 58 can be formed as a single integral casting and is remote end threaded for connection of the tank, thus retaining the essential quick connect-disconnect or "breakaway" feature of the invention. It will also be obvious to those skilled in the art that various other revisions and modifications can be made in the preferred embodiments disclosed herein without departing from the spirit and scope of the invention. It is my intention however that all such revisions, modifications and variations which are within the spirit and scope of the invention be included within the scope of the following claims.

I claim:

1. The combination of a water storage tank and a tank tee fitting for removably connecting the tank to a supply line that carries water from a source to a discharge point, said tank tee fitting comprising:

a pipe fitting having a hollow body, two integral tubular main branches extending longitudinally from said body in opposite directions, and a tubular side branch extending laterally from said body, means on the outer ends of said main branches for connecting the branches in such a supply line, a pair of contiguous tubular bosses on said body centrally thereof and communicating with the interior thereof, said bosses extending upwardly from the body at acute angles to the vertical and angularly with respect to each other, means on said bosses for connecting a water pressure-responsive device to each of them in communication with the interior of said body, a cylindrical tube having one end slidable in said side branch and removably received therein, said end having a peripheral groove formed therein, means on the opposite end of said tube for connecting the tube to an inlet of said tank, a sealing ring interposed between said side branch and said one tube end to seal the joint between the tube and the pipe fitting, and set screw means in threaded engagement wiht said side branch and removably received in said groove in the tube to lock said joint, whereby said tank is connectable to supply lines disposed at differing angles with respect to the tank, the tank may be disconnected from a supply line to which it is connected by loosening said set screw means to remove the same from said groove and removing said one end of the tube from said side branch, and a tank having said tube connected thereto thereafter may be connected to the supply line by reversing the latter procedure.

2. The combination of claim 1 and including a second tubular side branch extending laterally from said body oppositely to the first-named side branch thereby to form a cross-type pipe fitting with the body and the remaining branches.

3. The combination of claim 1 and wherein said side branch is integral with said body.

4. The combination of claim 1 and wherein said side branch includes an inner tubular section integral with said body and a discrete outer tubular section, and including flange means on the respective sections for detachably connecting the sections together, said sealing ring being disposed between said sections.

5. A tank tee fitting for removably connecting a water storage tank to a supply line that carries water from a source to a discharge point and comprising:

a pipe fitting having a hollow body, two integral tubular main branches extending longitudinally from said body in opposite directions, and an integral tubular side branch extending laterally from said body, means on the outer ends of said main branches for connecting the branches in such a supply line, a pair of contiguous tubular bosses on said body centrally thereof and communicating with the interior thereof, said bosses extending upwardly from the body at acute angles to the vertical and angularly with respect to each other, means on said bosses for connecting a water pressure-responsive device to each of them in communication with the interior of said body, a cylindrical tube having one end slidable in said side branch and removably received therein, said end having a peripheral groove formed therein, means on the opposite end of said tube for connecting the tube to an inlet of such a tank, a sealing ring interposed between said side branch and said one tube end to seal the joint between the tube and the pipe fitting, and set screw means in threaded engagement with said side branch and removably received in said groove in the tube to lock said joint.

whereby a water storage tank may be connected to supply lines disposed at differing angles with respect to the tank, the tank may be disconnected from a supply line to which it is connected by loosening said set screw means to remove the same from said groove and removing said one end of the tube from said side branch, and a tank having said tube connected thereto may be connected to the supply line by reversing the latter procedure.

6. The fitting of claim 5 and including a second tubular side branch extending laterally from said body oppositely to the first-named side branch thereby to form a cross-type pipe fitting with the body and the remaining branches.

7. The fitting of claim 6 and including means forming a groove in said side branch around the inner periphery thereof, said sealing ring being mounted in the latter groove.

8. A tank tee fitting for removably connecting a water storage tank to a supply line that carries water from a source to a discharge point and comprising:
   a pipe fitting having a hollow body, two integral tubular main branches extending longitudinally from said body in opposite directions, and a tubular side branch extending laterally from said body, said side branch including an inner tubular section integral with said body and a discrete outer tubular section,
   flange means on the respective sections for detachably connecting the sections together,
   means on the outer ends of said main branches for connecting the branches in such a supply line,
   a pair of contiguous tubular bosses on said body centrally thereof and communicating with the interior thereof, said bosses extending upwardly from the body at acute angles to the vertical and angularly with respect to each other,
   means on said bosses for connecting a water pressure-responsive device to each of them in communication with the interior of said body,
   a cylindrical tube having one end slidable in said side branch and removably received therein, said end having a peripheral groove formed therein,
   means on the opposite end of said tube for connecting the tube to an inlet of such a tank,
   a sealing ring disposed between said sections and interposed between said side branch and said one tube end to seal the joint between the tube and the pipe fitting, and
   set screw means in threaded engagement with said outer section and removably received in said groove in the tube to lock said joint,
   whereby a water storage tank may be connected to supply lines disposed at differing angles with respect to the tank, the tank may be disconnected from a supply line to which it is connected by loosening said set screw means to remove the same from said groove and removing said one end of the tube from said side branch, and a tank having said tube connected thereto may be connected to the supply line by reversing the latter procedure.

9. The combination of a water storage tank and a tank tee fitting for removably connecting the tank to a supply line that carries water from a source to a discharge point, said tank tee fitting comprising:
   a pipe fitting having a hollow body, two integral tubular main branches extending longitudinally from said body in opposite directions, and a tubular side branch extending laterally from said body, said side branch including an inner tubular section integral with said body and a discrete outer tubular section,
   flange means on the respective sections for detachably connecting the sections together,
   means on the outer ends of said main branches for connecting the branches in such a supply line,
   a cylindrical tube having one end slidable in said side branch and removably received therein, said end having a peripheral groove formed therein,
   means on the opposite end of said tube for connecting the tube to an inlet of said tank,
   a sealing ring disposed between said sections and interposed between said side branch and said one tube end to seal the joint between the tube and the pipe fitting, and
   set screw means in threaded engagement with said outer section and removably received in said groove in the tube to lock said joint,
   whereby said tank is connectable to supply lines disposed at differing angles with respect to the tank, the tank may be disconnected from a supply line to which it is connected by loosening said set screw means to remove the same from said groove and removing said one end of the tube from said side branch, and a tank having said tube connected thereto thereafter may be connected to the supply line by reversing the latter procedure.

* * * * *